Oct. 30, 1962    R. M. VAUGHN    3,060,565
METHOD OF MAKING IMPROVED SCREW DRIVER
Original Filed Jan. 9, 1959    3 Sheets-Sheet 1

INVENTOR.
RUDOLPH M. VAUGHN
BY Elliott & Pastoriza
ATTORNEYS

Oct. 30, 1962 R. M. VAUGHN 3,060,565
METHOD OF MAKING IMPROVED SCREW DRIVER
Original Filed Jan. 9, 1959 3 Sheets-Sheet 2

INVENTOR.
RUDOLPH M. VAUGHN
BY Elliott & Pastoriza
ATTORNEYS

Oct. 30, 1962 R. M. VAUGHN 3,060,565
METHOD OF MAKING IMPROVED SCREW DRIVER
Original Filed Jan. 9, 1959 3 Sheets-Sheet 3

INVENTOR.
RUDOLPH M. VAUGHN
BY Elliott & Pastoriza
ATTORNEYS

# United States Patent Office 3,060,565
Patented Oct. 30, 1962

3,060,565
METHOD OF MAKING IMPROVED SCREW DRIVER
Rudolph M. Vaughn, 2008 N. Westwood, Santa Ana, Calif.
Original application Jan. 9, 1959, Ser. No. 785,969. Divided and this application Apr. 6, 1961, Ser. No. 101,205
2 Claims. (Cl. 29—558)

This invention relates generally to screw drivers and more particularly to a method of forming an improved high torque screw driver for use with screw head slots provided with undercut non-planar surfaces of revolution as described, for example, in my U.S. Patent No. 2,677,-985.

This invention is a division of my co-pending application Serial No. 785,969, filed January 9, 1959, now Patent No. 2,994,354.

The slotted screw head construction as fully set forth in the above-mentioned Patent No. 2,677,985 enables an extremely high torque to be applied to the screw by means of a specially constructed driver. The preferred screw driver for such screw is described and claimed in my U.S. Patent No. 2,808,087 wherein the sides of the driving end of the driver constitute non-planar surfaces of revolution arranged to engage in full surface contact the undercut surfaces of the screw slot.

It has been found with the foregoing driver construction, however, that upon application of extremely high torque such as to cause yielding of the metal defining the slotted screw head, the radially outermost regions of the slot yield prior to deformation of the central portions of the slot with the consequence that the driver will tend to cam out of the slot causing burrs at the outer slot edges. By forming the non-planar side surfaces of the driver with a slightly different configuration from that described in the said U.S. Patent No. 2,808,087, yielding of the metal forming the driver slot can be made to take place centrally and then gradually extend radially outwardly from the slot with the result that a much higher torque can be achieved prior to destruction of the slot.

With the foregoing in mind, it is a primary object of the present invention to provide a method of forming the driver end of an improved screw driver constituting an improvement over the screw driver described in United States Patent No. 2,808,087, which is of such construction that a higher torque may be applied to a slotted screw head of the type set forth in my United States Patent No. 2,677,985 prior to destruction of the slot.

Briefly, the improved screw driver contemplates the provision of a driving end having an arcuate bottom of given radius of curvature similar to the driving end of the driver described in the said U.S. Pat. No. 2,808,087. Rather than the non-planar conical surfaces of revolution on the opposite sides of the driver, however, there are provided in accordance with the present invention concave cylindrical surfaces. The axes of these cylindrical surfaces converge towards each other to intersect the longitudinal axes of the screw driver itself at a point above the termination point of the radius of curvature of the arcuate bottom. Further, the radius of curvature of each of the cylindrical surfaces is a pre-determined multiple of the radius of curvature of the arc defining the arcuate bottom of the driver such that when employed in a corresponding slotted screw head, the desired yielding of the material of the screw head is initiated at the central portion of the slot and then extends radially outwardly.

In accordance with the method of the invention, an arcuate bottom is first formed on the driving end of the screw driver of a first given radius of curvature. A cutting wheel whose axis forms an acute angle with the longitudinal axis of the driver is then caused to be moved towards one side of the driving end to form the desired concave cylindrical surface. The cylindrical surface cutting wheel is then caused to move inwardly towards the opposite side to provide a similar concave cylindrical surface. The ratio of the radius of the cylindrical surface cutting wheel to the radius of curvature of the arcuate bottom is equal to the pre-determined multiple described above to effect the desired action in the slotted screw head.

A better understanding of the invention as well as various further features and advantages will be had by referring to the accompanying drawings in which.

Figure 9:
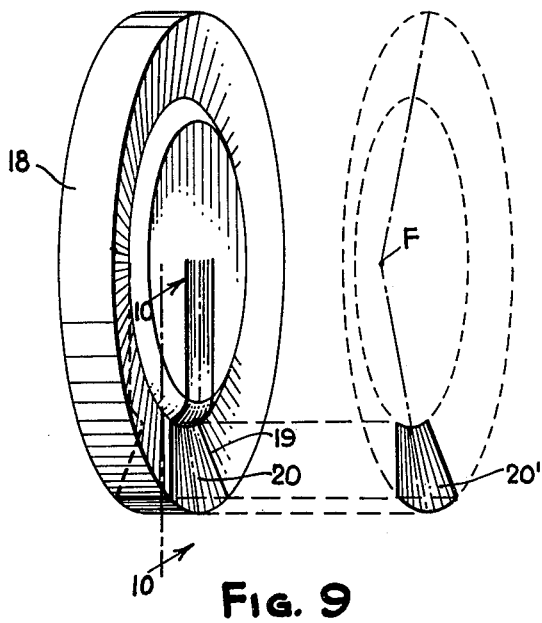
Figure 10:
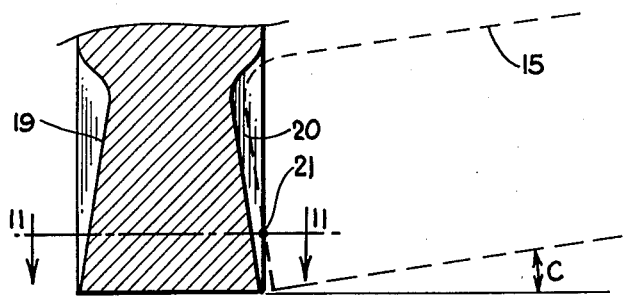
Figure 11:
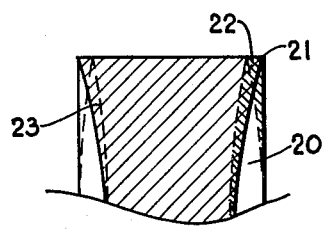

FIGURE 9 is a schematic perspective view illustrating the characteristics of the screw driver as described in my U.S. Pat. No. 2,808,087;

FIGURE 10 illustrates the manner in which the side surfaces of the driver of FIGURE 9 are modified in accordance with the present invention; and, FIGURE 11 is a fragmentary cross sectional view taken in the direction of the arrows 11—11 of FIGURE 10.

The geometry of the improved screw driver can best be understood by describing the preferred method of forming the driving end in accordance with the invention. Thus, referring first to FIGURE 1, there is shown a screw driver blank provided with a driving end 12. The screw driver may be of a conventional type or may be provided with a simple upper socket as shown for receiving a handle driver all as is well known in the art. In accordance with the first step of the method, the bottom of the driving end 12 is provided with a radius as by means of a cutting wheel 13. As shown, the cutting wheel 13 is provided with arcuate teeth and is arranged to be rotated at a high speed and moved rectilinearly under the driving end 12 as indicated by the arrow to form therein the desired arcuate radius.

Figure 1:
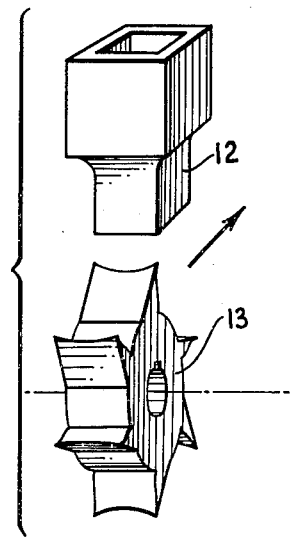
FIGURE 1 is a schematic perspective view showing a first step of the method of forming the improved screw driver of this invention.
Figure 2:
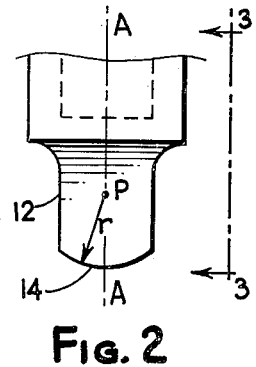
FIGURE 2 is a side view of the driving end of FIGURE 1 after the first step of the method has been completed.
Figure 3:
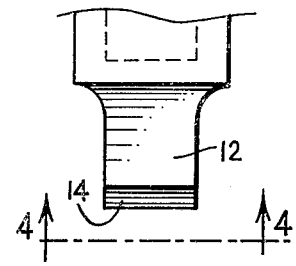
FIGURE 3 is a view taken in the direction of the arrows 3—3 of FIGURE 2.
Figure 4:
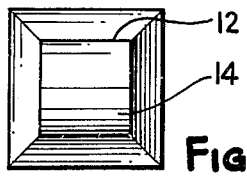
FIGURE 4 is another view taken in the direction of the arrows 4—4 of FIGURE 3.

Referring to FIGURE 2, the driving end 12 is shown after the cutting operation described in FIGURE 1 has been completed. In FIGURE 2, the bottom is designated 14 and has a first radius of curvature $r$. This radius of curvature will terminate on the longitudinal axis A—A of the driver at a point P above the bottom of the driving end 12. FIGURES 3 and 4 illustrate front and bottom views of the driving end 12 and arcuate bottom 14.

Figure 5:
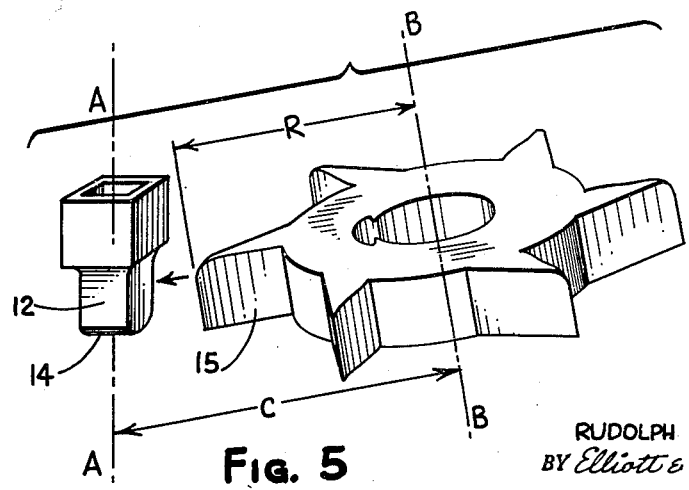
FIGURE 5 is a schematic illustration of a second step of the method of forming the driving end of the driver according to the invention.

After the foregoing operation has been completed, the sides of the driving end 12 on either side of the plane of the arc defining the arcuate bottom 14 are formed into concave cylindrical surfaces by means of a cutting wheel 15 shown in FIGURE 5. The cutting wheel 15 has a radius R and is positioned to rotate about an axis B—B which will define the axis of any cylindrical surface cut by the teeth of the wheel 15. As shown in FIGURE 5, the axis B—B forms an acute angle C with the longitudinal axis of the driver A—A such that when the cutting wheel 15 is moved towards the side surface of the driving end 12 as indicated by the small arrow, the axis of the cut cylindrical surface will be parallel to the original position of the axis of the cutting wheel B—B and will also lie in the plane of the longitudinal axis A—A. The angle between the axis B—B and the axis A—A is substantially ten degrees but may, depending upon certain applications of the driving end, vary between five and fifteen degrees.

After one side surface of the driving end 12 has been cut, the same procedure is repeated on the other side by simply rotating the driving end 12 about the axis A—A through 180 degrees and then bringing in the cutting wheel to the opposite side. By this operation, the opposite sides of the driving end 12 will have surfaces of concave cylindrical shape, the axes of these cylindrical surfaces converging towards each other to intersect the longitudinal axis A—A at a point well above the point P of FIGURE 2 denoting the termination point of the radius of curvature of the arcuate bottom 14.

Figure 6:
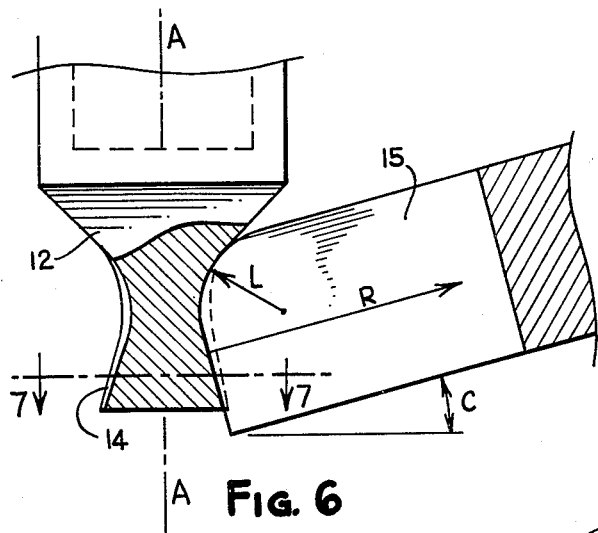
FIGURE 6 is an enlarged schematic view of the cutting operation described in connection with FIGURE 5.

FIGURE 6 illustrates the cutting wheel 15 in engagement with the resulting cylindrical surface on the side of the driving end 12 wherein the angle between the plane of the cutting wheel 15 and the horizontal is equal to the angle C between the axis B—B of the cutting wheel and the longitudinal axis of the driver.

Figures 7, 8:
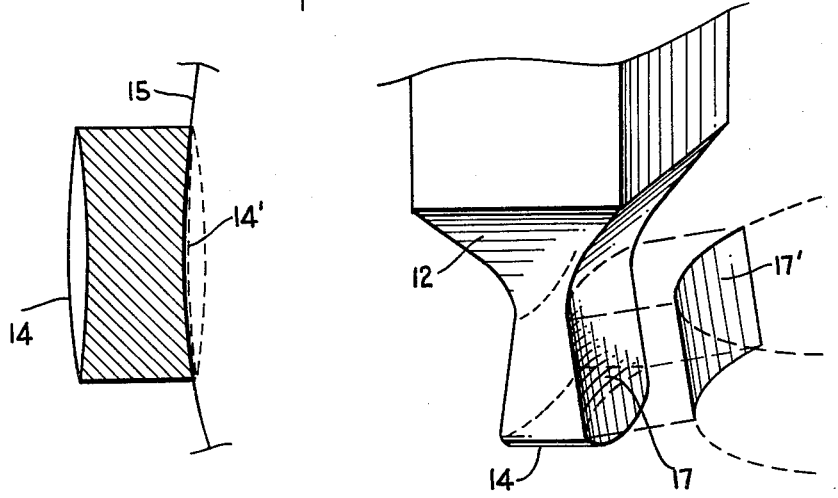
FIGURE 7 is a cross-sectional view taken in the direction of the arrows 7—7 of FIGURE 6.
FIGURE 8 is a perspective view of the completed driver end illustrating a projection of one of the side surfaces thereof.

FIGURE 7 illustrates the effect of the angulation of the axis of the cutting wheel 15 with respect to the longitudinal axis. As a result of this angulation, more material is removed from the sides of the driving end 12 adjacent the termination points of the arc defining the arcuate bottom than adjacent to the lower central portion thereof. In other words, as indicated by the dotted line 14', the lower edges of the central or lowermost point of the arcuate bottom do not have as much material removed.

The upper peripheral edge of the cutting wheel teeth may be radiused as indicated at L in FIGURE 6 to provide a smooth undercut portion in the upper sides of the driving end 12 as shown.

In the preferred embodiment of the invention, the radius of curvature of the cylindrical surfaces corresponds to the radius R of the cutting wheel 15 and is from four to eight times the radius of curvature r of the arcuate bottom 14 of FIGURE 2. In the particular application in which the driver is employed in slotted screw heads of the type set forth in the aforementioned Patent No. 2,677,985, the radius R is from five to seven times the radius r.

FIGURE 8 illustrates the completed driving end and illustrates one side cylindrical concave surface portion 17 projected from the side as at 17'.

The completed screw driver driving end thus includes basically an arcuate bottom of a first radius of curvature and opposite sides of concave cylindrical surfaces wherein the axes of these cylindrical surfaces converge towards each other to intersect the longitudinal axis of the driver at a point above the driving end.

Referring now to FIGURES 9, 10, and 11, the advantage of the improved screw driver over the screw driver set forth in my U.S. Patent No. 2,677,985 will be described.

In FIGURE 9, there is shown a circular blank 18 from which a driving end 19 may be cut to provide a driver in accordance with the teachings of my said U.S. Pat. No. 2,677,985. This driver includes an arcuate bottom having a radius of curvature equal to the radius of the circular blank 18 and opposite sides of non-planar conical surfaces of revolution 20. The non-planar conical aspect of these surfaces may best be understood by referring to the projected surface 20' which illustrates clearly that it constitutes a part of a surface of a cone having an apex at the point F.

If the driving end 19 of the driver described in FIGURE 9 is now subjected to the operations described in connection with FIGURES 5 and 6, these non-planar conical side surfaces of revolution will be modified into cylindrical surfaces. Thus, if the radius of curvature of the cutting wheel forming the cylindrical surfaces is maintained within the range of from five to seven times the radius of the arcuate bottom of the driving end 19, the cutting of the cylindrical surfaces will modify the non-planar conical surfaces as illustrated in FIGURES 10 and 11 by removing more material from the termination points of the arc defining the arcuate bottom than from the lower center portions of the arcuate bottom.

The foregoing action will be clear by referring specifically to FIGURE 10 wherein the cutting wheel 15 is shown in dashed lines as being moved in towards the non-planar conical surface 20. It will be evident that if this cutting wheel is angulated at the angle C or substantially ten degrees as described heretofore, it will first engage an extreme end or termination portion of the arcuate bottom as at 21 prior to engaging the central edges of the non-planar side surfaces 20 thereby removing more material from the ends of the arc than the center.

Referring specifically to FIGURE 11 which is a cross section in the direction of the arrows 11—11 of FIGURE 10, the initial portion of material removed is illustrated as the shaded area 22. When the operation is repeated for the other side of the driving end 19, similar material is removed as indicated by the dashed line 23.

As a consequence of the relative narrowing of the driver at the opposite ends of the arc defining the arcuate bottom of the driving end, an improved action within a slotted screw head takes place. Thus, when the driving end 19 of FIGURE 10 after having its side surfaces modified as described, is inserted in a slotted screw head having undercut surfaces of non-planar conical shape, and a torque is applied to the driver, the central portions of the driver from which substantially no material has been removed by the cylindrical surface cutting wheel will be in engagement with the corresponding portions of the slot, but the areas radially extending from the center of the slot adjacent the arcuate ends of the bottom of the driver will not be in complete surface engagement. Upon increasing the torque, therefore, yielding of the undercut slot structure will take place from the center of the slot radially outwardly so that eventually the entire undercut surfaces will be brought into engagement with the far ends of the driver end whereby the entire load will tend to distribute itself along the undercut sides of the slot from a central position radially to an outermost position in accordance with the structural strength of the slot itself.

The material defining the slot in the screw head is of greater strength at the central portion of the screw head than at the outer portions simply as a consequence of there being more material present at the center. Therefore, the provision of the modified type of driver as described herein will enable a higher torque to be applied to the slotted screw head prior to destruction of the head than is possible with the full surface contact driving end described in FIGURE 9 and set forth in my previous U.S. Patent No. 2,808,087.

From the foregoing, it will be evident that the present invention has, therefore, provided a method of forming an improved driving end for a screw driver. The principal advantage of this improved construction resides in the capability of providing increased torque on a slotted screw head without the formation of burrs at the arcuate ends of these slots which burrs will occur if yielding of the material of the slot head commences at the outer ends rather than centrally from within the slot and then radially outwardly.

Modifications that fall clearly within the scope and spirit of this invention will occur to those skilled in the art. The method of forming the improved screw driver is, therefore, not to be thought of as limited to the exact steps set forth for illustrative purposes.

What is claimed is:

1. A method of forming the driving end of a screw driver, comprising the steps of: moving a first cutting wheel having concave arcuate shaped cutting teeth across the bottom end of said screw driver in a straight line normal to the axis of said screw driver to provide an arcuate bottom of a first radius of curvature; moving a second cutting wheel inwardly against one side of said driving end of said screw driver, the axis of rotation of said cutting wheel forming an acute angle with said axis of said screw driver and intersecting said axis above said driving end to generate a concave cylindrical surface portion on said one side; and repeating said last mentioned step on the other side of said driving end.

2. The method of claim 1, in which the radius of curvature of said cylindrical surface is within the range of four to eight times said first radius of curvature.

References Cited in the file of this patent

UNITED STATES PATENTS

| | | |
|---|---|---|
| 961,184 | Walker | June 14, 1910 |
| 2,066,372 | Tomalis | Jan. 5, 1937 |
| 2,206,770 | Drummond | July 2, 1940 |